United States Patent
Yoshizawa et al.

(10) Patent No.: US 6,945,224 B2
(45) Date of Patent: Sep. 20, 2005

(54) INTAKE AIR AMOUNT CONTROL APPARATUS FOR VEHICLE ENGINE AND METHOD THEREOF

(75) Inventors: Hidekazu Yoshizawa, Isesaki (JP); Kenichi Machida, Isesaki (JP)

(73) Assignee: Hitachi, Ltd., Tokyo-to (JP)

( * ) Notice: Subject to any disclaimer, the term of this patent is extended or adjusted under 35 U.S.C. 154(b) by 0 days.

(21) Appl. No.: 11/043,061

(22) Filed: Jan. 27, 2005

(65) Prior Publication Data

US 2005/0166895 A1 Aug. 4, 2005

(30) Foreign Application Priority Data

Feb. 2, 2004 (JP) .............................. 2004-025736

(51) Int. Cl.$^7$ ............................................. F02D 13/04
(52) U.S. Cl. .................... 123/346; 123/321; 123/90.15
(58) Field of Search ................................ 123/321, 345, 123/346, 347, 348, 90.15, 90.16

(56) References Cited

U.S. PATENT DOCUMENTS

| | | | |
|---|---|---|---|
| 6,491,022 B2 * | 12/2002 | Okamoto | 123/396 |
| 6,595,172 B2 * | 7/2003 | Kabasin et al. | 123/90.16 |
| 6,779,508 B2 * | 8/2004 | Fuwa | 123/396 |
| 6,834,627 B2 * | 12/2004 | Hiraku et al. | 123/90.15 |
| 2003/0019475 A1 * | 1/2003 | Machida et al. | 123/405 |
| 2004/0244473 A1 * | 12/2004 | Tamura et al. | 73/118.1 |

FOREIGN PATENT DOCUMENTS

| | | | | |
|---|---|---|---|---|
| JP | JP 4-362245 | * | 12/1992 | F02D 13/02 |
| JP | JP 2001-130248 | * | 5/2001 | B60H 1/32 |
| JP | 2001-254637 A | | 9/2001 | |

* cited by examiner

*Primary Examiner*—Hai Huynh
(74) *Attorney, Agent, or Firm*—Foley & Lardner LLP

(57) ABSTRACT

In a control apparatus for controlling an intake air amount of an engine by variably controlling a lift amount of an intake valve, when a variable valve lift mechanism is failed, the control is switched to a control of the intake air amount based on an opening degree of a throttle valve, and also the opening degree of the throttle valve is restricted within an upper limit value in order to ensure a negative pressure utilized by a brake booster.

18 Claims, 12 Drawing Sheets

INTAKE AIR AMOUNT CONTROL APPARATUS FOR VEHICLE ENGINE AND METHOD THEREOF

BACKGROUND OF THE INVENTION

1. Field of the Invention

The present invention relates to an intake air amount control apparatus for a vehicle engine provided with a variable valve mechanism which varies a lift amount of an intake valve and a brake booster for assuring a master vacuum negative pressure by using a negative pressure of the engine, and a method thereof.

2. Description of the Related Art

In a valve characteristic control apparatus disclosed in Japanese Unexamined Patent Publication No. 2001-254637, it is diagnosed whether or not a variable valve lift mechanism is failed, based on a target lift amount and an actual lift amount of an engine valve.

Further, in the above valve characteristic control apparatus, when it is detected that the variable valve lift mechanism is failed, there are performed the processing of: increasing a fuel supply amount; prohibiting a leaning control; extending an operation region where the fuel supply is cut off; and correcting an engine rotation speed for resuming the fuel supply from the fuel supply cut off condition.

However, if an intake valve is fixed at a low lift condition due to the failure of the variable valve lift mechanism, an opening area of the intake valve becomes small, so that an amount of air sucked into a cylinder is significantly restricted.

Therefore, in the condition where the intake valve is fixed at the low lift condition, in order to increase the engine rotation speed in a tow load area to enhance the stability, an opening of an intake throttle valve, such as a throttle valve or the like, needs to be made larger, to achieve an increase of a cylinder intake air amount.

However, if the opening of the intake throttle valve is made larger, since an intake negative pressure of the engine approaches the atmospheric pressure, a brake booster for assuring a master vacuum negative pressure by using the negative pressure of the engine is not operated normally, resulting in the reduction of braking force.

SUMMARY OF THE INVENTION

It is, therefore, an object of the present invention to ensure an amount of intake air required for engine operations and also to ensure acquirement of a negative pressure sufficient for being utilized by a brake booster, when an intake valve is fixed at a low lift condition due to a failure of a variable valve mechanism.

In order to achieve the above object, according to the present invention;
- an intake air flow amount of an engine is controlled by controlling a lift amount of an intake valve and also an intake negative pressure of the engine is controlled to be constant by controlling an opening of an intake throttle valve, when a variable valve mechanism is normal, and
- the driving of the variable valve mechanism is stopped and the opening of the intake throttle valve is controlled to control the intake air flow amount of the engine, and also the opening of the intake throttle valve for controlling the intake air flow amount is restricted to an upper limit value or a value smaller than the upper limit value, when the variable valve mechanism is failed.

The other objects and features of the invention will become understood from the following description with reference to the accompanying drawings.

PREFERRED EMBODIMENT

Figure 1:
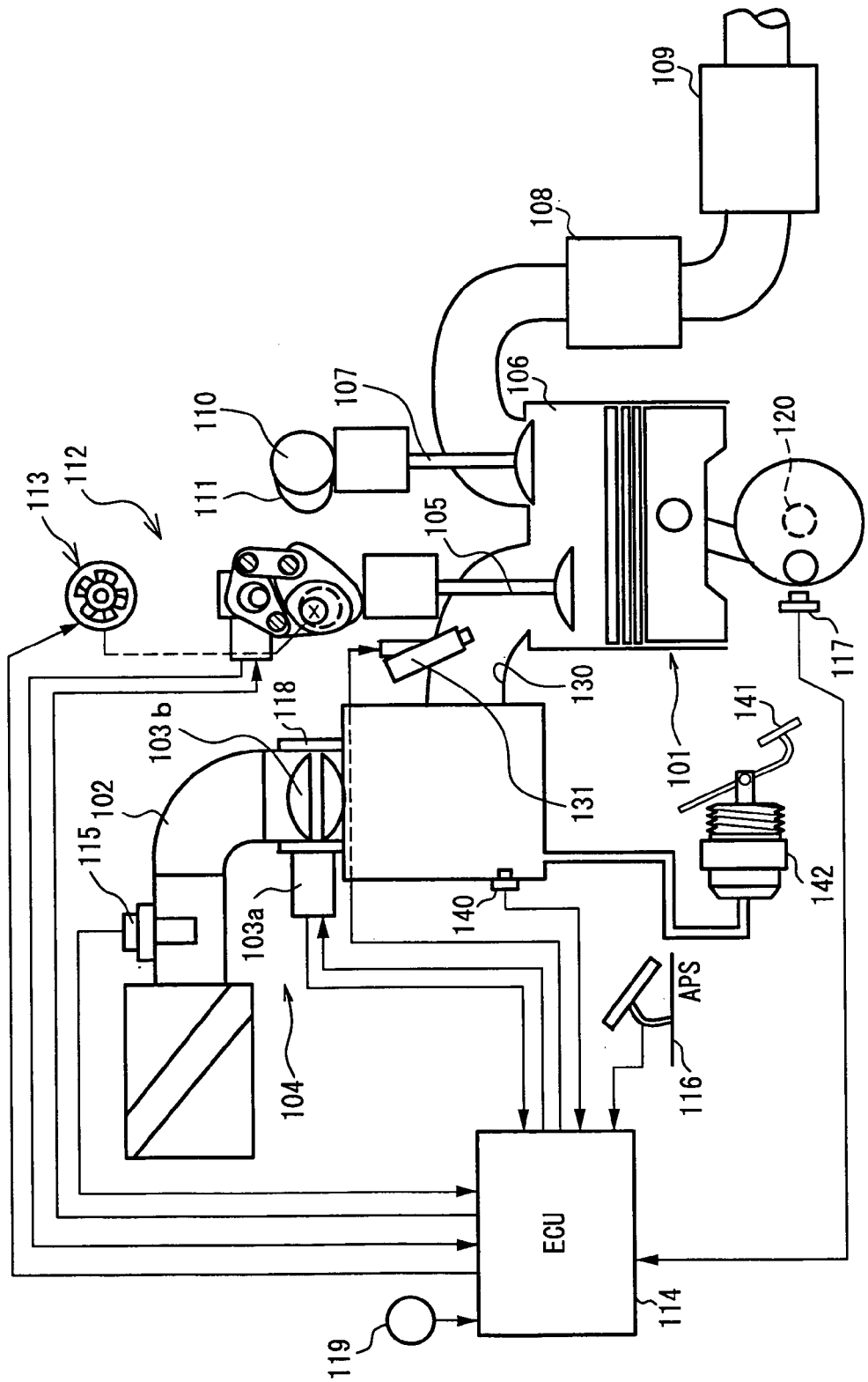
FIG. 1 is a systematic diagram of an engine according to an embodiment of a present invention.

FIG. 1 is a systematic diagram of a vehicle engine according to an embodiment of a present invention.

In FIG. 1, in an intake pipe 102 of an internal combustion engine 101, an electronically controlled throttle 104 is disposed.

Electronically controlled throttle 104 is a device for driving a throttle valve (intake throttle valve) 103b to open and close by a throttle motor 103a (actuator).

Then, air is sucked into a combustion chamber 106 of the engine 101 via electronically controlled throttle 104 and an intake valve 105.

A combusted exhaust gas is discharged from combustion chambers 106 via an exhaust valve 107, and thereafter, is purified by a front catalyst 108 and a rear catalyst 109, to be emitted into the atmosphere.

The exhaust valve 107 is driven by a cam 111 axially supported by an exhaust side camshaft 110, to open and close, while maintaining a fixed lift amount, a fixed valve operating angle and fixed valve timing.

On the other hand, there is disposed a variable valve event and lift (VEL) mechanism 112 which continuously varies a lift amount of the intake valve 105 as well as an operating angle thereof.

Further, there is disposed a variable valve timing control (VTC) mechanism 113 which changes a rotation phase of an intake side camshaft relative to a crankshaft, to continuously vary a center phase of the operating angle of the intake valve 105.

An engine control unit (ECU) 114 controls VEL mechanism 112 and VTC mechanism 113 to control an intake air amount of engine 101 and a residual gas rate in a cylinder of the engine 101, and at the same time, controls electronically controlled throttle 104 so as to obtain a predetermined intake negative pressure.

ECU 114 comprises a microcomputer.

ECU receives detection signals from various sensors.

As the various sensors, there are disposed an air flow meter 115 detecting an intake air flow amount of engine 101, an accelerator opening sensor 116 detecting an accelerator opening, a crank angle sensor 117 taking a crank rotation signal out of crankshaft 120, a throttle sensor 118 detecting an opening TVO of throttle valve 103b, a water temperature sensor 119 detecting a cooling water temperature of engine 101, an intake pressure sensor 140 detecting an intake pressure on the downstream side of throttle valve 103b, and the like.

Further, a fuel injection valve 131 is disposed on an intake port 130 at the upstream side of intake valve 105.

Fuel injection valve 131 is driven to open based on an injection pulse signal from ECU 114 to inject fuel of an amount proportional to the injection pulse width (valve opening time) of the injection pulse signal.

Moreover, a vehicle in which engine 101 is installed, is provided with a brake booster 142 for increasing a braking force by a brake pedal 141 using the intake negative pressure on the downstream of throttle valve 103b.

Figure 2:
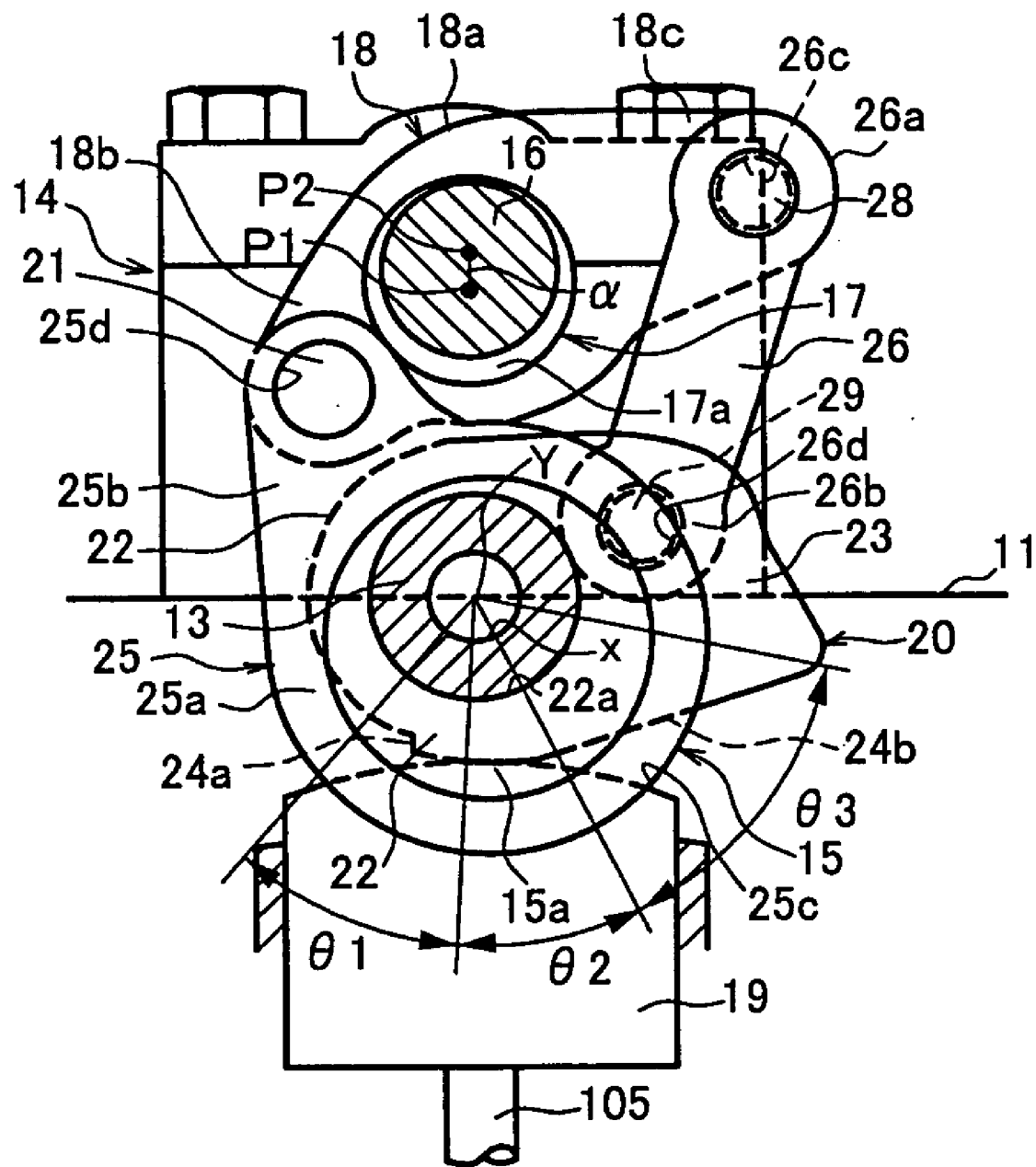
FIG. 2 is a cross section view showing a variable valve event and lift mechanism according to the embodiment (A—A cross section view in FIG. 3).
Figure 3:
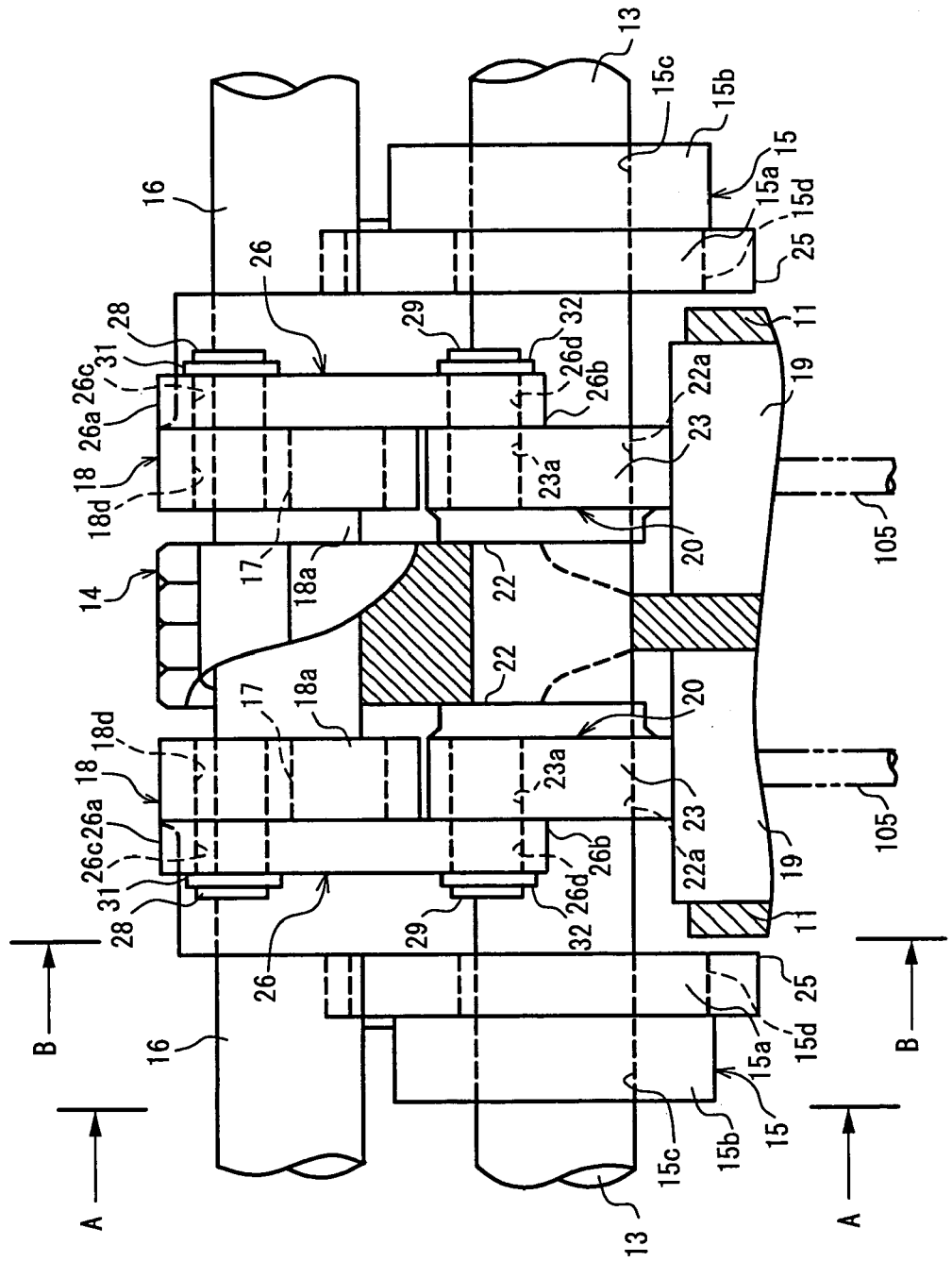
FIG. 3 is a side elevation view of the variable valve event and lift mechanism.
Figure 4:
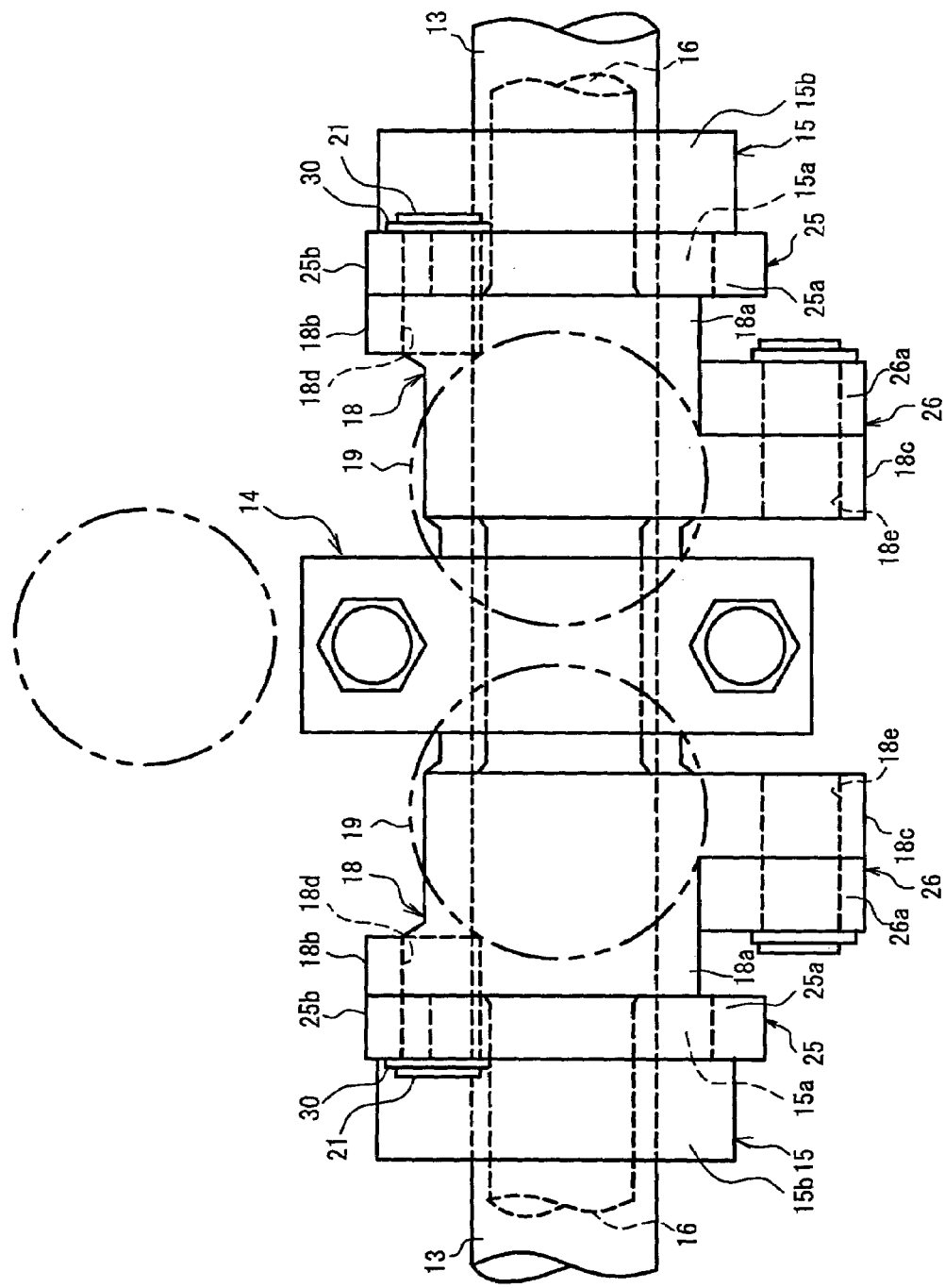
FIG. 4 is a top plan view of the variable valve event and lift mechanism.

FIG. 2 to FIG. 4 show in detail the structure of VEL mechanism 112.

VEL mechanism 112 shown in FIG. 2 to FIG. 4 includes a pair of intake valves 105, 105, a hollow camshaft 13 rotatably supported by a cam bearing 14 of a cylinder head 11, two eccentric cams 15, 15 (drive cams) being rotation cams which are axially supported by camshaft 13, a control shaft 16 rotatably supported by cam bearing 14 and arranged in parallel at an upper position of camshaft 13, a pair of rocker arms 18, 18 swingingly supported by control shaft 16 through a control cam 17, and a pair of independent swing cams 20, 20 disposed to upper end portions of intake valves 105, 105 through valve lifters 19, 19, respectively.

Eccentric cams 15, 15 are connected with rocker arms 18, 18 by link arms 25, 25, respectively. Rocker arms 18, 18 are connected with swing cams 20, 20 by link members 26, 26.

Rocker arms 18, 18, link arms 25, 25, and link members 26, 26 constitute a transmission mechanism.

Figure 5:
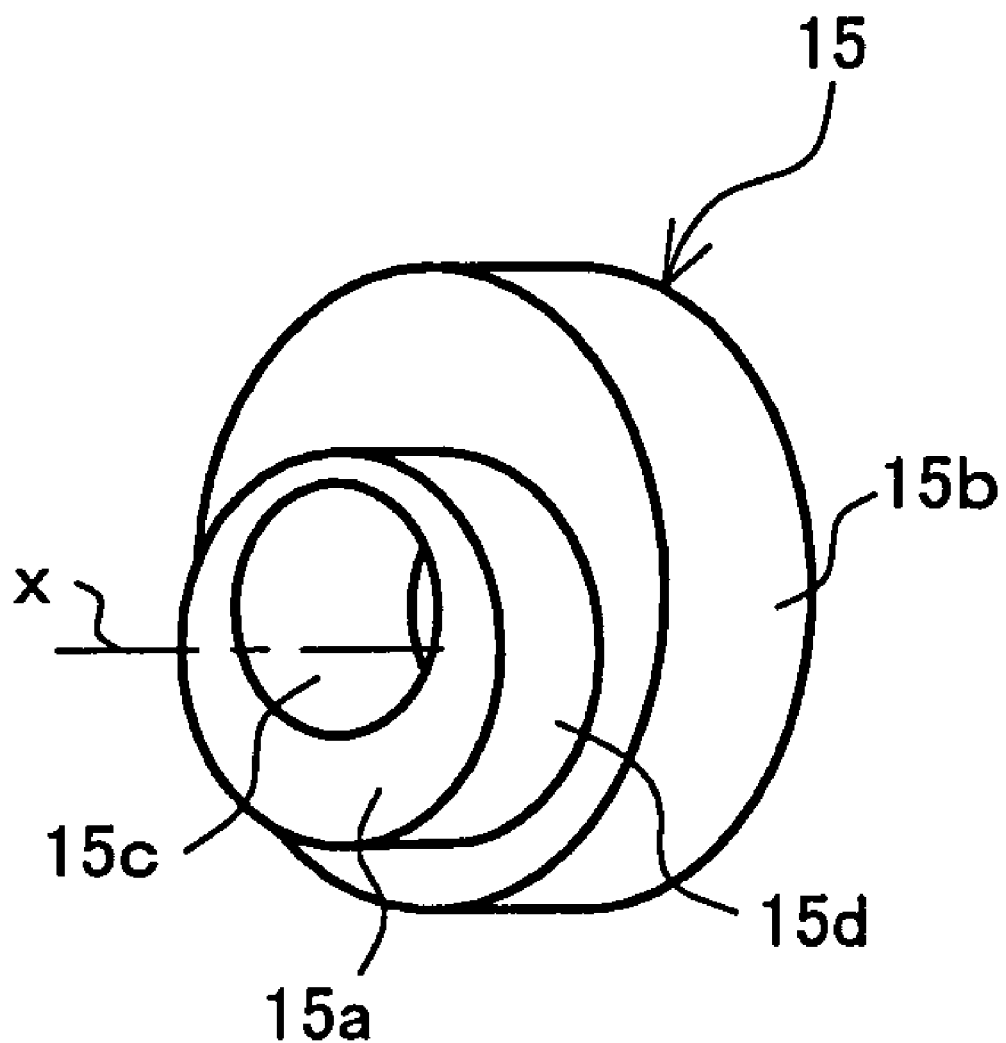
FIG. 5 is a perspective view showing an eccentric cam for use in the variable valve event and lift mechanism.

Each eccentric cam 15, as shown in FIG. 5, is formed in a substantially ring shape and includes a cam body 15a of small diameter, a flange portion 15b integrally formed on an outer surface of cam body 15a. A camshaft insertion hole 15c is formed through the interior of eccentric cam 15 in an axial direction, and also a center axis X of cam body 15a is biased from a center axis Y of camshaft 13 by a predetermined amount.

Eccentric cams 15, 15 are pressed and fixed to camshaft 13 via camshaft insertion holes 15c at outsides of valve lifters 19, 19, respectively, so as not to interfere with valve lifters 19, 19.

Each rocker arm 18, as shown in FIG. 4, is bent and formed in a substantially crank shape, and a central base portion 18a thereof is rotatably supported by control cam 17.

A pin hole 18d is formed through one end portion 18b which is formed to protrude from an outer end portion of base portion 18a. A pin 21 to be connected with a tip portion of link arm 25 is pressed into pin hole 18d. A pin hole 18e is formed through the other end portion 18c which is formed to protrude from an inner end portion of base portion 18a. A pin 28 to be connected with one end portion 26a (to be described later) of each link member 26 is pressed into pin hole 18e.

Control cam 17 is formed in a cylindrical shape and fixed to an outer periphery of control shaft 16. As shown in FIG. 2, a center axis P1 position of control cam 17 is biased from a center axis P2 position of control shaft 16 by α.

Figure 6:
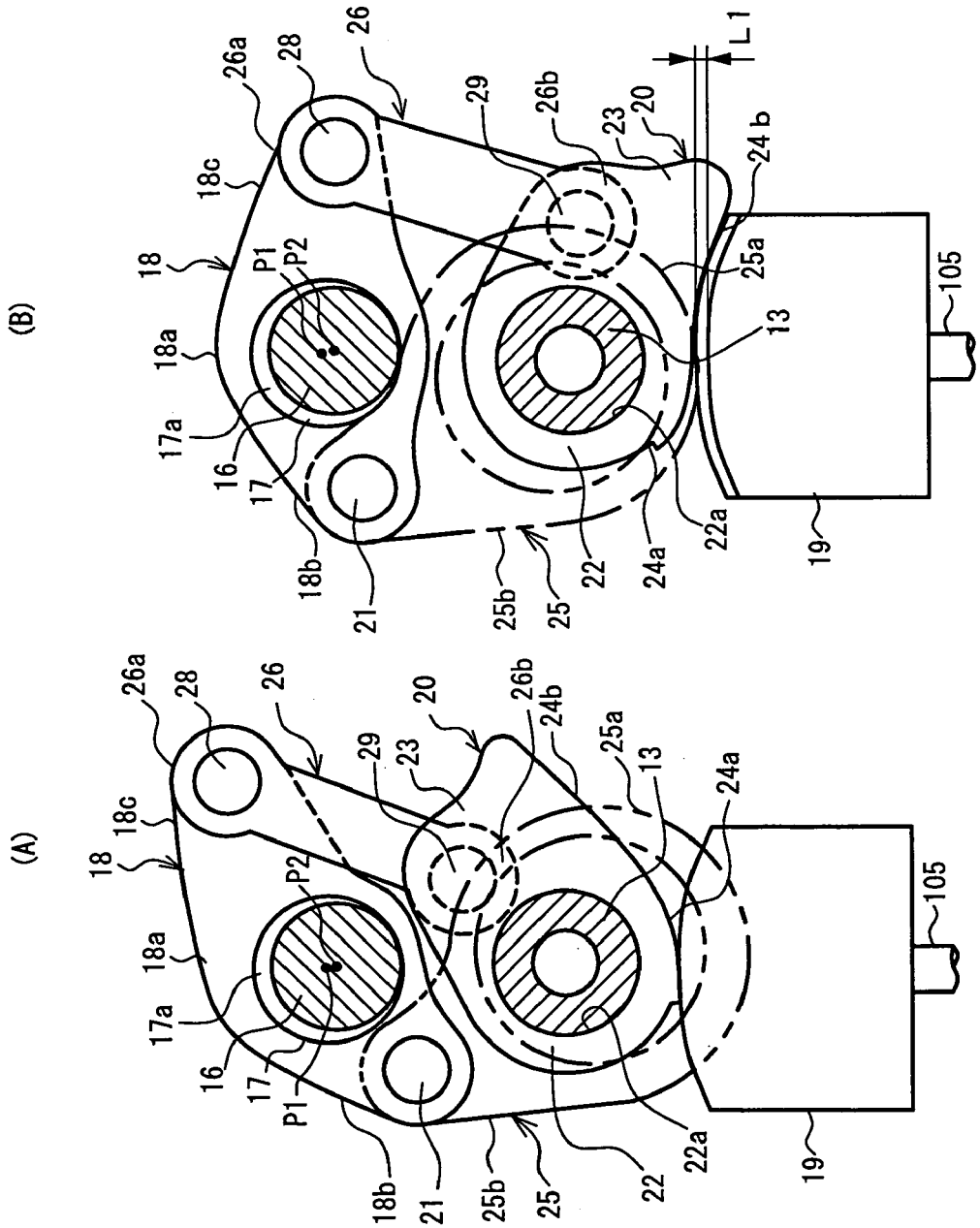
FIG. 6 is a cross sectional view showing a low lift control condition of the variable valve event and lift mechanism (B—B cross section view of FIG. 3).
Figure 7:
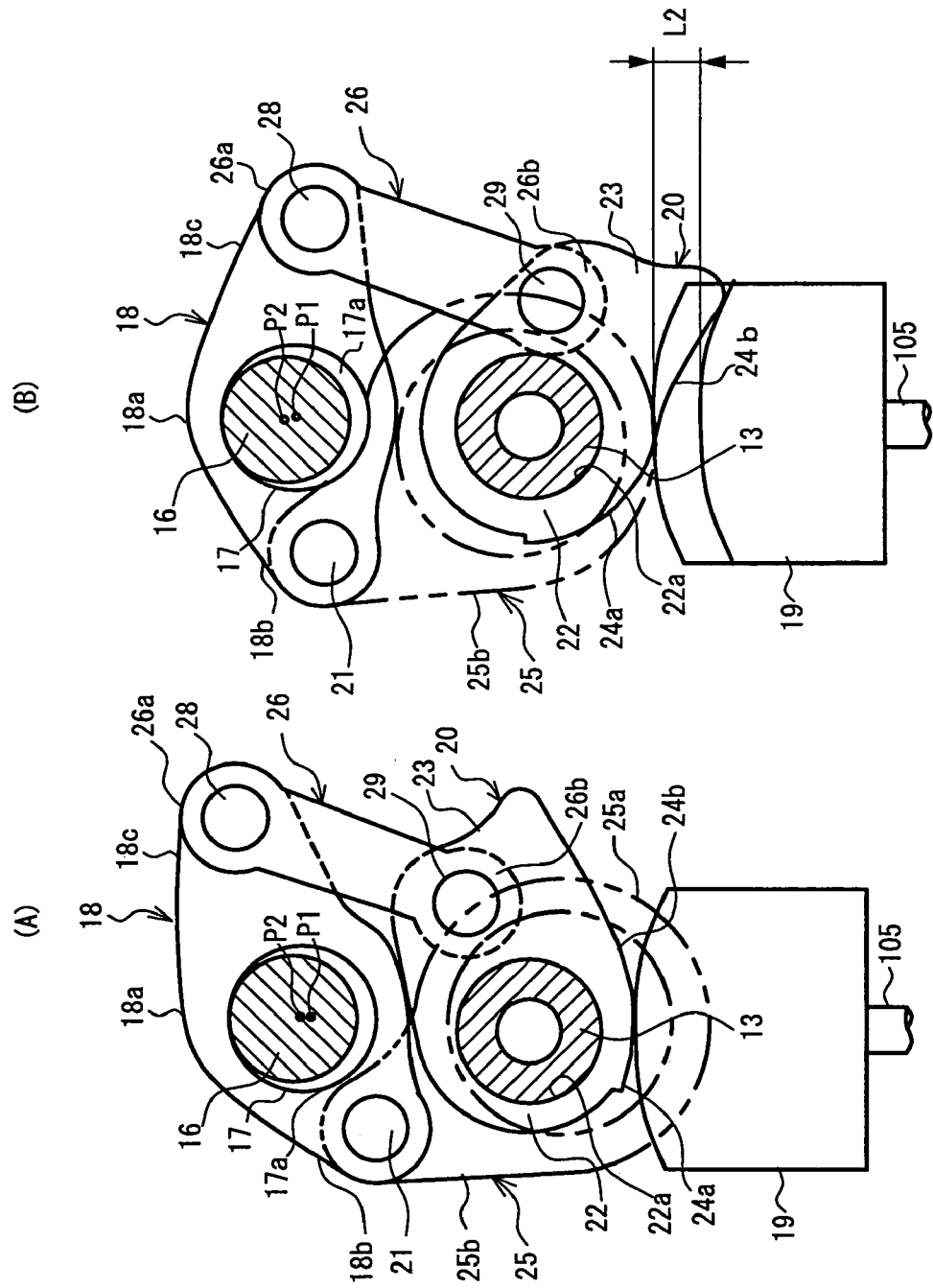
FIG. 7 is a cross sectional view showing a high lift control condition of the variable valve event and lift mechanism (B—B cross section view of FIG. 3).

Swing cam 20 is formed in a substantially lateral U-shape as shown in FIG. 2, FIG. 6 and FIG. 7, and a supporting hole 22a is formed through a substantially ring-shaped base end portion 22. Camshaft 13 is inserted into supporting hole 22a to be rotatably supported. Also, a pin hole 23a is formed through an end portion 23 positioned at the other end portion 18c of rocker arm 18.

A base circular surface 24a of base end portion 22 side and a cam surface 24b extending in an arc shape from base circular surface 24a to an edge of end portion 23, are formed on a bottom surface of swing cam 20. Base circular surface 24a and cam surface 24b are in contact with a predetermined position of an upper surface of each valve lifter 19 corresponding to a swing position of swing cam 20.

Figure 8:
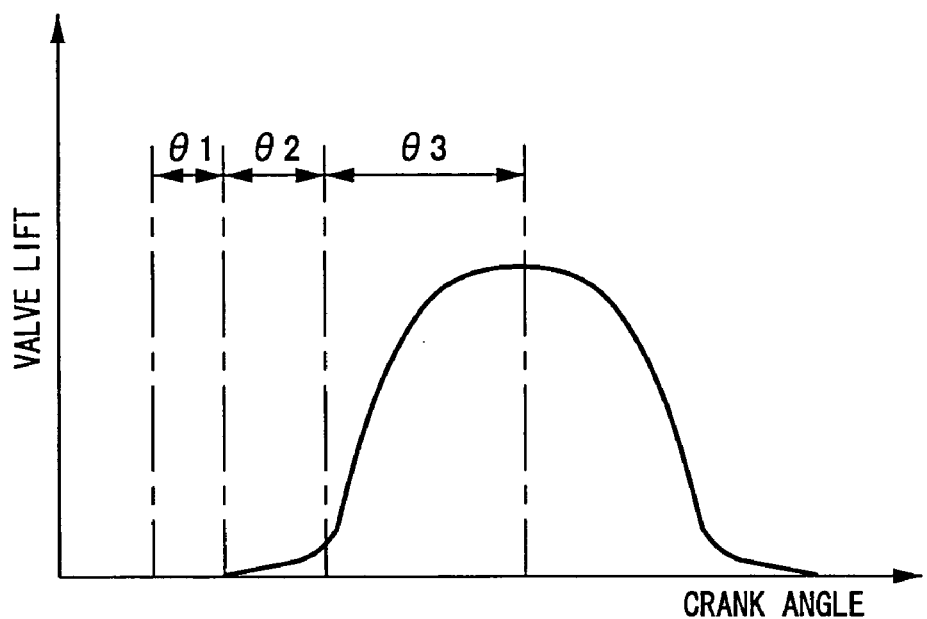
FIG. 8 is a graph showing a lift characteristic of an intake valve in the variable valve characteristic mechanism.

Namely, according to a valve lift characteristic shown in FIG. 8, as shown in FIG. 2, a predetermined angle range θ1 of base circular surface 24a is a base circle interval and a range of from base circle interval θ1 of cam surface 24b to a predetermined angle range θ2 is a so-called ramp interval, and a range of from ramp interval θ2 of cam surface 24b to a predetermined angle range θ3 is a lift interval.

Link arm 25 includes a ring-shaped base portion 25a and a protrusion end 25b protrudingly formed on a predetermined position of an outer surface of base portion 25a. A fitting hole 25c to be rotatably fitted with the outer surface of cam body 15a of eccentric cam 15 is formed on a central position of base portion 25a. Also, a pin hole 25d into which pin 21 is rotatably inserted is formed through protrusion end 25b.

Link member 26 is formed in a linear shape of predetermined length and pin insertion holes 26c, 26d are formed through both circular end portions 26a, 26b. End portions of pins 28, 29 pressed into pin hole 18d of the other end portion 18c of rocker arm 18 and pin hole 23a of end portion 23 of swing cam 20, respectively, are rotatably inserted into pin insertion holes 26c, 26d.

Snap rings 30, 31, 32 restricting axial transfer of link arm 25 and link member 26 are disposed on respective end portions of pins 21, 28, 29.

In such a constitution, depending on a positional relation between the center axis P2 of control shaft 16 and the center axis P1 of control cam 17, as shown in FIG. 6 and FIG. 7, the valve lift amount is varied, and by driving control shaft 16 to rotate, the position of the center axis P2 of control shaft 16 relative to the center axis P1 of control cam 17 is changed.

Figure 9:
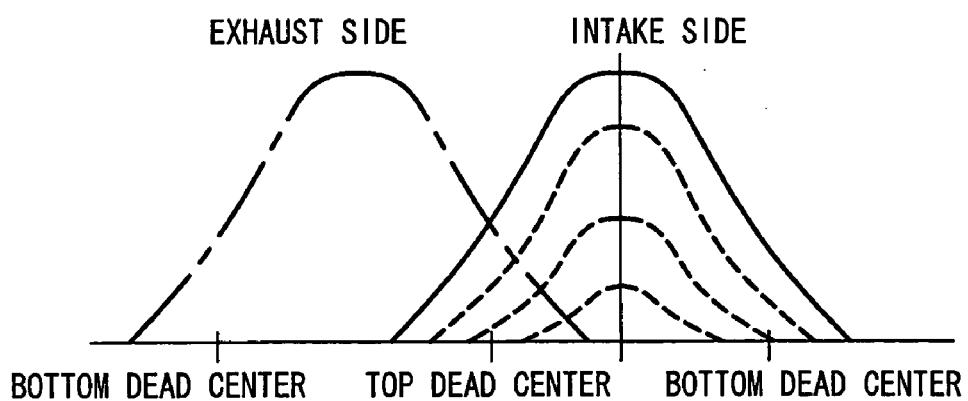
FIG. 9 is a graph showing a correlation between valve timing and a lift amount in the variable valve event and lift mechanism.
Figure 10:
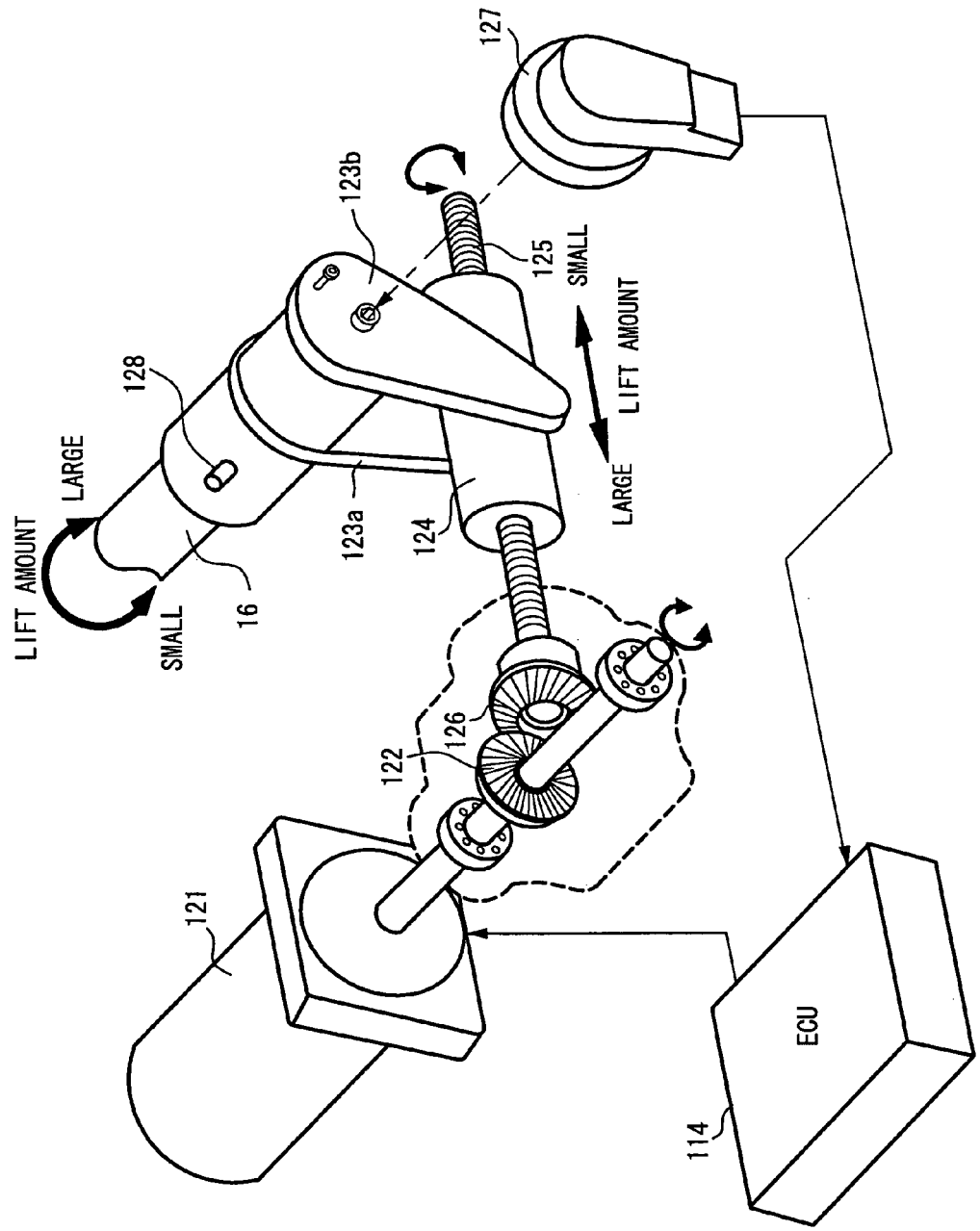
FIG. 10 is a perspective view showing a driving mechanism of a control shaft in the variable valve event and lift mechanism.

Control shaft 16 is driven to rotate within a predetermined rotation angle range, which is restricted by a stopper, by a DC servo motor (actuator) 121 as shown in FIG. 10. By varying a rotation angle of control shaft 16 by actuator 121, the lift amount and operating angle of each of intake valves 105, 105 are continuously varied within a variable range between a maximum valve lift amount and a minimum valve lift amount, which is restricted by the stopper (refer to FIG. 9).

In FIG. 10, DC servo motor 121 is arranged so that a rotation shaft thereof is parallel to control shaft 16, and a bevel gear 122 is axially supported by a tip portion of the rotation shaft.

On the other hand, a pair of stays 123a, 123b is fixed to the tip end of control shaft 16. A nut 124 is swingingly supported around an axis parallel to control shaft 16 connecting tip portions of the pair of stays 123a, 123b.

A bevel gear 126 meshed with bevel gear 122 is axially supported at a tip end of a threaded rod 125 engaged with nut 124. Threaded rod 125 is rotated by the rotation of DC servo motor 121, and the position of nut 124 engaged with threaded rod 125 is displaced in an axial direction of threaded rod 125, so that control shaft 16 is rotated.

Here, the valve lift amount is decreased as the position of nut 124 approaches bevel gear 126, while the valve lift amount is increased as the position of nut 124 gets away from bevel gear 126.

Further, a potentiometer type angle sensor 127 detecting the angle of control shaft 16 is disposed on the tip end of control shaft 16, as shown in FIG. 10. ECU 114 feedback controls DC servo motor 121 so that an actual angle detected by angle sensor 127 coincides with a target angle.

A stopper member 128 is formed to protrude from the outer periphery of control shaft 16. When stopper member 128 is in contact with a receiving member on the fixing side (not shown in the figure) in both of a valve lift amount increasing direction and a valve lift amount decreasing direction, the rotation range of control shaft 16 is restricted, and as a result, the maximum valve lift amount and the minimum valve lift amount are restricted.

Figure 11:
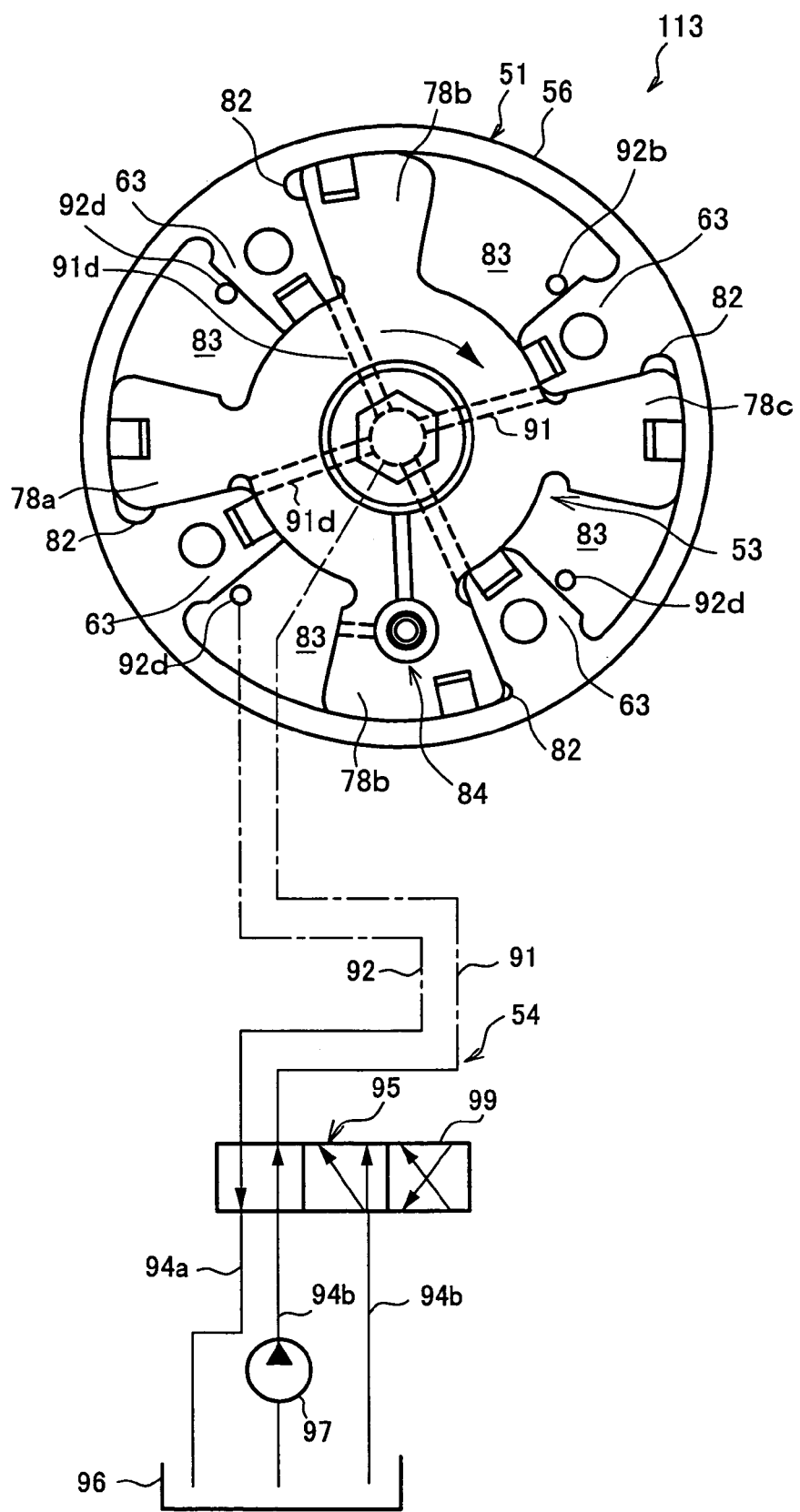
FIG. 11 is a cross sectional view showing a variable valve timing mechanism according to the embodiment of the present invention.

Next, the structure of VTC mechanism 113 will be described based on FIG. 11.

VTC mechanism 113 in the present embodiment is a so-called vane type variable valve timing mechanism, and comprises: a cam sprocket 51 (timing sprocket) which is rotatably driven by crankshaft 120 via a timing chain; a rotation member 53 secured to an end portion of intake side camshaft 13 and rotatably housed inside cam sprocket 51; a hydraulic circuit 54 which relatively rotates rotation member 53 with respect to cam sprocket 51; and a lock mechanism 60 which selectively locks a relative rotation position between cam sprocket 51 and rotation member 53 at predetermined positions.

Cam sprocket 51 comprises: a rotation portion (not shown in the figure) having on an outer periphery thereof, teeth for engaging with the timing chain (or timing belt); a housing 56 located forward of the rotation portion, for rotatably housing rotation member 53; and a front cover and a rear cover (not shown in the figure) for closing front and rear openings of housing 56.

Housing 56 presents a cylindrical shape formed with both front and rear ends open and with four partition portions 63 protrudingly provided at positions on the inner peripheral face at 90° in the circumferential direction, four partition portions 63 presenting a trapezoidal shape in transverse section and being respectively provided along the axial direction of housing 56.

Rotation member 53 is secured to the front end portion of intake side camshaft 14 and comprises an annular base portion 77 having four vanes 78a, 78b, 78c, and 78d provided on an outer peripheral face of base portion 77 at 90° in the circumferential direction.

First through fourth vanes 78a to 78d present respectively cross-sections of approximate trapezoidal shapes. The vanes are disposed in recess portions between each partition portion 63 so as to form spaces in the recess portions to the front and rear in the rotation direction. Advance angle side hydraulic chambers 82 and retarded angle side hydraulic chambers 83 are thus formed.

Lock mechanism 60 has a construction such that a lock pin 84 is inserted into an engagement hole (not shown in the figure) at a rotation position (in the reference operating condition) on the maximum retarded angle side of rotation member 53.

Hydraulic circuit 54 has a dual system oil pressure passage, namely a first oil pressure passage 91 for supplying and discharging oil pressure to advance angle side hydraulic chambers 82, and a second oil pressure passage 92 for supplying and discharging oil pressure to retarded angle side hydraulic chambers 83. To these two oil pressure passages 91 and 92 are connected a supply passage 93 and drain passages 94a and 94b, respectively, via an electromagnetic switching valve 95 for switching the passages.

An engine driven oil pump 97 for pumping oil in an oil pan 96 is provided in supply passage 93, and the downstream ends of drain passages 94a and 94b are communicated with oil pan 96.

First oil pressure passage 91 is formed substantially radially in a base 77 of rotation member 53, and connected to four branching paths 91d communicating with each advance angle side hydraulic chamber 82. Second oil pressure passage 92 is connected to four oil galleries 92d opening to each retarded angle side hydraulic chamber 83.

In electromagnetic switching valve 95, an internal spool valve thereof is arranged so as to relatively control the switching between respective oil pressure passages 91 and 92, and supply passage 93 and drain passages 94a and 94b.

ECU 114 controls the power supply quantity for an electromagnetic actuator 99 which drives electromagnetic switching valve 95, based on a duty control signal superimposed with a dither signal.

For example, when a control signal of duty ratio 0% (OFF signal) is output to electromagnetic actuator 99, the hydraulic fluid pumped from oil pump 47 is supplied to retarded angle side hydraulic chambers 83 via second oil pressure passage 92, and the hydraulic fluid in advance angle side hydraulic chambers 82 is discharged into oil pan 98 from first drain passage 94a via first oil pressure passage 91.

Consequently, an inner pressure of retarded angle side hydraulic chambers 83 becomes a high pressure while an inner pressure of advance angle side hydraulic chambers 82 becomes a low pressure, and rotation member 53 is rotated to the most retarded angle side by means of vanes 78a to 78d. The result of this is that a valve opening period (valve opening time and valve closing time) of intake valve 105 is delayed.

On the other hand, when a control signal of duty ratio 100% (ON signal) is output to electromagnetic actuator 99, the hydraulic fluid is supplied to inside of advance angle side hydraulic chambers 82 via first oil pressure passage 91, and the hydraulic fluid in retarded angle side hydraulic chambers 83 is discharged into oil pan 98 via second oil pressure passage 92 and second drain passage 94b, so that the inner pressure of retarded angle side hydraulic chambers 83 become a low pressure.

Therefore, rotation member 53 is rotated to the full to the advance angle side by means of vanes 78a to 78d. As a result, the opening period (opening time and closing time) of intake valve 105 is advanced.

As described in the above, ECU 114 has a function of controlling electronically controlled throttle 104, VEL mechanism 112 and VTC mechanism 113, to control the engine intake air amount. Further, ECU 114 diagnoses whether or not VEL mechanism is failed, and performs the fail-safe processing as shown in a flowchart of FIG. 12, when VEL mechanism 112 is failed.

Figure 12:
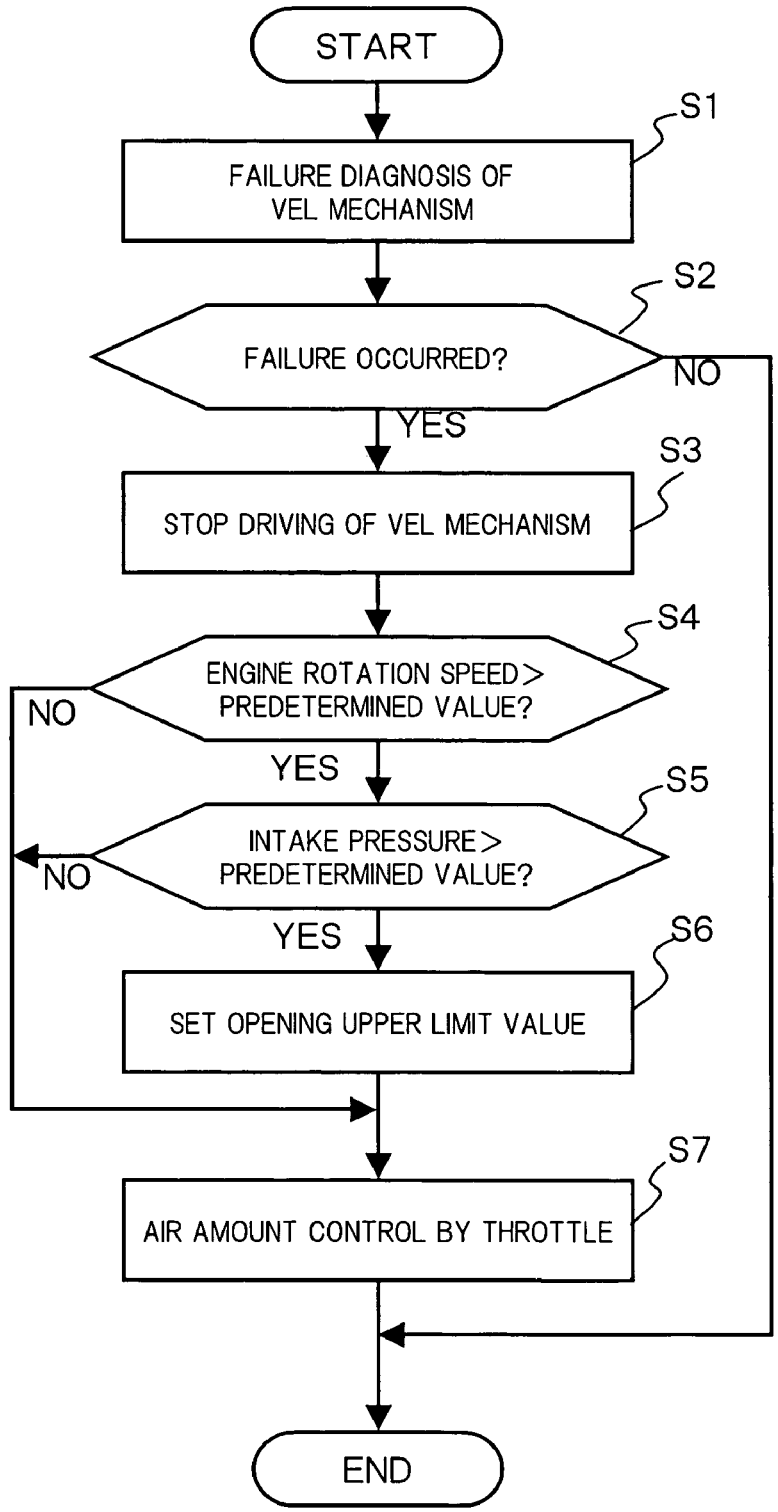
FIG. 12 is a flowchart showing an intake air amount control at the time when the variable valve event and lift mechanism is failed.

In the flowchart of FIG. 12, in step S1, it is diagnosed whether or not VEL mechanism 112 is failed.

In the failure diagnosis, for example in a feedback control for changing the angle of control shaft 16 in VEL mechanism 112 to follow a target angle, when a state where a control deviation is equal to or larger than a predetermined value stays for a predetermined period of time or in the case where an actual angle detected by angle sensor 127 is continuously changed in a state where the target value is not changed, it is judged that VEL mechanism 112 is failed.

Further, the failure diagnosis of components, such as angle sensor 127, DC servo motor 121 and the like, is included in the failure diagnosis in step S1, other than the function diagnosis as described above.

In step S2, based on the result of the diagnosis in step S1, it is determined whether or not an occurrence of failure in VEL mechanism 112 is judged.

Then, in the case where the occurrence of failure in VEL mechanism 112 is judged, control proceeds to step S3, where the driving of VEL mechanism 112 (DC servo motor 121) is stopped.

In step S4, it is judged whether or not the engine rotation speed at the time exceeds a predetermined value.

When the engine rotation speed is equal to or smaller than the predetermined value, even if the lift amount of intake valve 105 is the minimum value, it is possible to ensure a necessary cylinder air amount while ensuring the intake negative pressure required by brake booster 142.

However, if the engine rotation speed exceeds the predetermined value, in order to ensure the necessary cylinder air amount, it becomes necessary to further open throttle valve 103*b* compared with the opening thereof at the low rotation time. As a result, the intake negative pressure which is a negative pressure source of brake booster 142 is lowered.

Therefore, when it is judged in step S4 that the engine rotation speed is equal to or smaller than the predetermined value, by by-passing the processing of step S6, an intake air amount control by throttle valve 103*b* is performed without restricting the valve opening.

On the other hand, when it is judged in step S4 that the engine rotation speed exceeds the predetermined value, control proceeds to step S5.

In step S5, it is judged whether or not the intake pressure on the downstream of throttle valve 103*b* detected by intake pressure sensor 140 is equal to or larger than a predetermined value (whether or not the intake negative pressure is equal to or smaller than a predetermined value).

The predetermined value of the intake pressure is set based on the negative pressure required by brake booster 142. In the case where it is judged in step S5 that the intake pressure on the downstream of throttle valve 103*b* detected by intake pressure sensor 140 is equal to or larger than the predetermined value, it is judged that the intake negative pressure enough for brake booster 142 to operate is not ensured.

Therefore, when it is judged in step S5 that the intake pressure on the downstream of throttle valve 103*b* detected by intake pressure sensor 140 is equal to or larger than the predetermined value, control proceeds to step 86, where an opening upper limit value of throttle valve 103*b* is set, so that the opening of throttle valve 103*b* is restricted within a range where the negative pressure required by brake booster 142 can be ensured.

The above opening upper limit value can be set as a previously stored fixed value.

Figure 13:
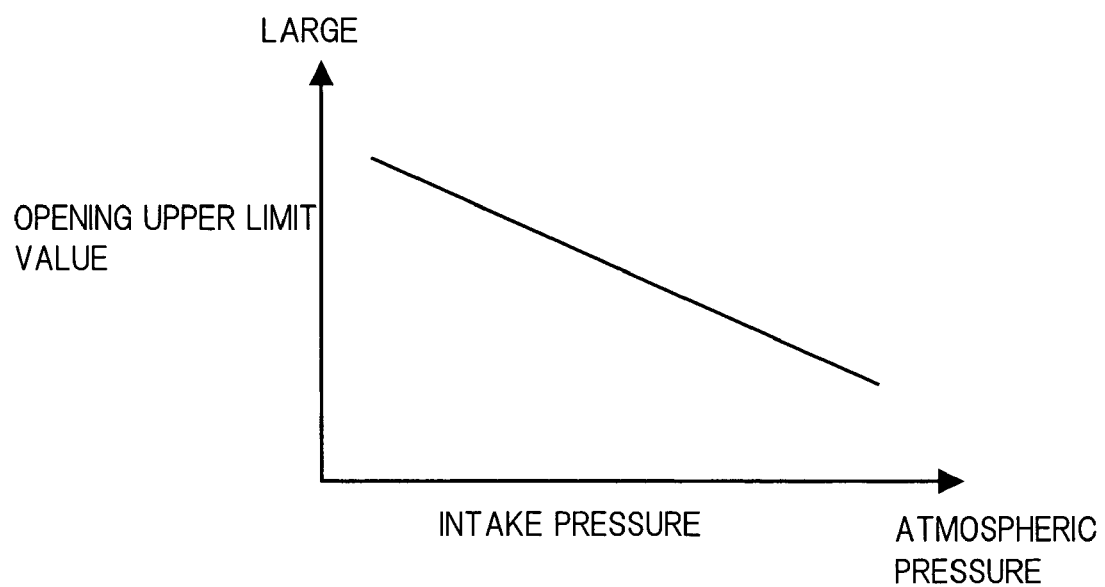
FIG. 13 is a graph showing a correlation between an intake pressure and an upper limit value of an opening of a throttle valve in the embodiment.

Further, as shown in FIG. 13, the above opening upper limit value can be set according to the intake pressure. In this case, as the intake pressure approaches the atmospheric pressure and accordingly, is low as the intake negative pressure, the opening upper limit value is changed to a smaller value.

As a result, the opening of throttle valve 103*b* can be restricted in minimum, up to an opening at which the negative pressure required by brake booster 142 is ensured.

In step S7, throttle valve 103*b* is controlled based on the accelerator opening, the engine rotation speed and the like, to adjust the engine intake air amount by throttle valve 103*b*. However, in the case where the opening upper limit value is set in step S6, the opening of throttle valve 103*b* is restricted to the opening upper limit value or less than the opening upper limit value.

According to the above embodiment, when the driving of VEL mechanism 112 is stopped due to the failure thereof and the intake air amount is controlled by the opening control of throttle valve 103*b*, the opening of throttle valve 103*b* is restricted so as to ensure the negative pressure required by brake booster 142.

Consequently, even if the variable valve mechanism is failed and the lift amount of the intake valve becomes a minimum, it is possible to maintain the operation of brake booster 142 while ensuring an air amount necessary for the safe operation of the engine, by controlling the opening of throttle valve 103*b*.

Further, in particular, if the opening upper limit value of throttle valve 103*b* is set based on an actual intake pressure, it is possible to ensure the negative pressure to be supplied to brake booster 142 while avoiding that the opening of throttle valve 103*b* is excessively restricted.

Note, the structure of the variable valve mechanism which varies the lift amount of intake valve 105 is not limited to VEL mechanism 112.

The entire contents of Japanese Patent Application No. 2004-025736 filed on Feb. 2, 2004, a priority of which is claimed, are incorporated herein by reference.

While only a selected embodiment has been chosen to illustrate the present invention, it will be apparent to those skilled in the art from this disclosure that various changes and modifications can be made herein without departing from the scope of the invention as defined in the appended claims.

Furthermore, the foregoing description of the embodiment according to the present invention is provided for illustration only, and not for the purpose of limiting the invention as defined in the appended claims and their equivalents.

We claim:

1. An intake air amount control apparatus for a vehicle engine provided with a brake booster for assuring a master vacuum negative pressure by using a negative pressure of said engine, comprising:
   an intake valve;
   a variable valve mechanism which varies a lift amount of said intake valve;
   an intake throttle valve disposed on an upstream side of said intake valve;
   an actuator opening/closing said intake throttle valve;

an operating condition detector detecting operating conditions of said engine; and
a control unit that receives detection signals from said operating condition detector and also outputs control signals to said variable valve mechanism and said actuator,
wherein said control unit diagnoses whether or not said variable valve mechanism is failed, and
controls an intake air flow amount of said engine by controlling the lift amount of said intake valve and also controls an intake negative pressure of said engine to be constant by controlling an opening degree of said intake throttle valve, when said variable valve mechanism is normal, while
stops the driving of said variable valve mechanism and controls the opening of said intake throttle valve to control the intake air flow amount of said engine, and also, restricts the opening degree of said intake throttle valve for controlling said intake air flow amount to an upper limit value or a value less than the upper limit value, when said variable valve mechanism is failed.

2. An intake air amount control apparatus for a vehicle engine according to claim 1,
wherein said operating condition detector includes an intake pressure sensor detecting an intake pressure of said engine, and
said control unit sets said upper limit value based on the intake pressure detected by said intake pressure sensor.

3. An intake air amount control apparatus for a vehicle engine according to claim 2,
wherein said control unit sets said upper limit value to a smaller value as the intake pressure approaches the atmospheric pressure.

4. An intake air amount control apparatus for a vehicle engine according to claim 1,
wherein said operating condition detector includes a rotation speed sensor detecting a rotation speed of said engine, and
said control unit executes the processing of restricting the opening degree of said intake throttle valve to said upper limit value, when the rotation speed of said engine detected by said rotation speed sensor is equal to or larger than a threshold.

5. An intake air amount control apparatus for a vehicle engine according to claim 1,
wherein said operating condition detector includes an intake pressure sensor detecting an intake pressure of said engine, and
said control unit executes the processing of restricting the opening degree of said intake throttle valve to said upper limit value, when the intake pressure detected by said intake pressure sensor is equal to or larger than a threshold.

6. An intake air amount control apparatus for a vehicle engine according to claim 1,
wherein said operating condition detector includes an intake pressure sensor detecting an intake pressure of said engine and a rotation speed sensor detecting a rotation speed of said engine, and
said control unit executes the processing of restricting the opening degree of said intake throttle valve to said upper limit value, when the rotation speed of said engine detected by said rotation speed sensor is equal to or larger than a threshold, and also the intake pressure detected by said intake pressure sensor is equal to or larger than a threshold.

7. An intake air amount control apparatus for a vehicle engine according to claim 6,
wherein said control unit sets said upper limit value based on the intake pressure detected by said intake pressure sensor.

8. An intake air amount control apparatus for a vehicle engine according to claim 1,
wherein said control unit feedback controls said variable valve mechanism based on a target valve lift amount, and when a state where a deviation between said target valve lift amount and an actual valve lift amount is equal to or larger than a predetermined value stays for a predetermined period of time, judges that said variable valve mechanism is failed.

9. An intake air amount control apparatus for a vehicle engine according to claim 1,
wherein said variable valve mechanism varies the lift amount and an operating angle of said intake valve, and
said intake air amount control apparatus further comprises a variable valve timing mechanism which varies a center phase of the operating angle of said intake valve.

10. An intake air amount control apparatus for a vehicle engine provided with a brake booster for assuring a master vacuum negative pressure by using a negative pressure of said engine, comprising:
an intake valve;
variable valve means for varying a lift amount of said intake valve;
an intake throttle valve disposed on the upstream side of said intake valve;
drive means for opening/closing said intake throttle valve;
operating condition detecting means for detecting operating conditions of said engine;
diagnosis means for diagnosing whether or not said variable valve mechanism is failed;
first control means for controlling an intake air flow amount of said engine by controlling the lift amount of said intake valve and also controlling an intake negative pressure of said engine to be constant by controlling an opening degree of said intake throttle valve, when said variable valve mechanism is normal; and
second control means for stopping the driving of said variable valve mechanism and controlling the opening degree of said intake throttle valve to control the intake air flow amount of said engine, and also, restricting the opening of said intake throttle valve for controlling said intake air flow amount to an upper limit value or a value less than the upper limit value, when said variable valve mechanism is failed.

11. An intake air amount control method for a vehicle engine provided with a brake booster for assuring a master vacuum negative pressure by using a negative pressure of said engine, a variable valve mechanism which varies a lift amount of an intake valve and an actuator opening/closing an intake throttle valve disposed on the upstream side of said intake valve, comprising the steps of:
diagnosing whether or not said variable valve mechanism is failed;
controlling an intake air flow amount of said engine by controlling the lift amount of said intake valve, when said variable valve mechanism is normal;
controlling an intake negative pressure of said engine to be constant by controlling an opening degree of said intake throttle valve, when said variable valve mechanism is normal;
stopping the driving of said variable valve mechanism, when said variable valve mechanism is failed;

controlling the opening degree of said intake throttle valve to control the intake air flow amount of said engine, when said variable valve mechanism is failed; and restricting the opening degree of said intake throttle valve for controlling said intake air flow amount to an upper limit value or a value less than the upper limit value.

12. An intake air amount control method for a vehicle engine according to claim 11, further comprising the steps of:

detecting an intake pressure of said engine, and setting said upper limit value based on said intake pressure.

13. An intake air amount control method for a vehicle engine according to claim 12, wherein said step of setting the upper limit value based on said intake pressure;

sets said upper limit value to a smaller value as said intake pressure approaches the atmospheric pressure.

14. An intake air amount control method for a vehicle engine according to claim 11, wherein said step of restricting the opening degree of said intake throttle valve to the upper limit value or a value less than the upper limit value comprises the steps of:

detecting a rotation speed of said engine; and restricting the opening degree of said intake throttle valve to said upper limit value, when said rotation speed of said engine is equal to or larger than a threshold.

15. An intake air amount control method for a vehicle engine according to claim 11, wherein said step of restricting the opening of said intake throttle valve to the upper limit value or a value less than the upper limit value comprises the steps of:

detecting an intake pressure of said engine; and restricting the opening degree of said intake throttle valve to said upper limit value, when said intake pressure is equal to or larger than a threshold.

16. An intake air amount control method for a vehicle engine according to claim 11, wherein said step of restricting the opening of said intake throttle valve to the upper limit value or a value less than the upper limit value comprises the steps of:

detecting an intake pressure of said engine;

detecting a rotation speed of said engine; and restricting the opening degree of said intake throttle valve to said upper limit value, when said rotation speed of said engine is equal to or larger than a threshold, and also said intake pressure is equal to or larger than a threshold.

17. An intake air amount control method for a vehicle engine according to claim 16, further comprising the steps of:

detecting the intake pressure of said engine; and setting said upper limit value based on said intake pressure.

18. An intake air amount control method for a vehicle engine according to claim 11, further comprising the step of;

feedback controlling said variable valve mechanism based on a target valve lift amount, wherein said step of diagnosing whether or not said variable valve mechanism is failed, comprises the steps of:

computing a deviation between said target valve lift amount and an actual valve lift amount;

judging whether or not said deviation is equal to or larger than a predetermined value;

measuring the duration in which said deviation is equal to or larger than the predetermined value; and judging that said variable valve mechanism is failed, when said duration reaches or exceeds a predetermined period of time.

* * * * *